United States Patent [19]

Kanematsu et al.

[11] Patent Number: 4,521,860
[45] Date of Patent: Jun. 4, 1985

[54] METHODS OF ENTERING MACHINING INFORMATION AND DISPLAY THEREFOR IN A NUMERICALLY CONTROLLED MACHINE TOOL

[75] Inventors: Hiroyuki Kanematsu, Konan; Akimitsu Nagae, Kasugai; Kiyohisa Mizoguchi, Nagoya; Hajime Ohashi, Konan, all of Japan

[73] Assignee: Yamazaki Machinery Works, Ltd., Oguchi, Japan

[21] Appl. No.: 413,250

[22] Filed: Aug. 30, 1982

[30] Foreign Application Priority Data

Sep. 14, 1981 [JP] Japan ................. 56-145854
Oct. 15, 1981 [JP] Japan ................. 56-165936

[51] Int. Cl.³ .................. G06F 15/46; G05B 19/18
[52] U.S. Cl. .................. 364/474; 364/171; 364/191
[58] Field of Search .............. 364/474, 475, 167–171, 364/191–193; 318/568; 340/701–704, 712, 722

[56] References Cited

U.S. PATENT DOCUMENTS 3,757,095  9/1973  Kiwiet ...................... 364/171 X
4,033,206  7/1977  Morita et al. ............... 364/171 X
4,303,973 12/1981  Williamson, Jr. et al. ..... 340/722 X
4,425,559  1/1984  Sherman .................... 340/703 X
4,445,182  4/1984  Morita et al. ............... 364/171 X Primary Examiner—Joseph Ruggiero
Attorney, Agent, or Firm—Dennison, Meserole, Pollack & Scheiner

[57] ABSTRACT

Disclosed herein is a method of controlling a numerically controlled machine tool comprising the steps of classifying cutting tools and machining order for the respective machining patterns determined in response to the final machining contour of a workpiece machined by a numerically controlled machine tool like a machining center, for example in case of the final machining contour with a counter bore and a tap, the cutting tools and machining order of centering—drilling—end milling for a counter bore and centering—drilling—tapping for a tap, by the unit of machining patterns; storing the classification in the numerically controlled machine tool; reading, during machining of the workpiece, a unit of machining patterns corresponding to the machining contour of the workpiece on a display unit; machining the workpiece with numerical information as to each machining patterns entered in the numerically controlled machine tool; and displaying the machining process conditions on the display unit.

8 Claims, 64 Drawing Figures 6-1A 
6-1B 
6-1C 
6-1D 
6-1E 
6-1F 
6-1G 
6-1H 8-3A, 3B 8-3C 8-3D 8-3E 8-3F 8-3G

DRILLING UNIT

| MACH-ING UNIT | WIDTH | DEPTH | CHMF AMT | | | | | | | |
|---|---|---|---|---|---|---|---|---|---|---|
| DRILLING | 20. | 40. | 1. | | | | | | | |

| MACH-ING ELEMENT | MACH-ING HOLE | STARTING HOLE | INFEED | MACH-ING PATTERN | TOOL NAME | NOM ⌀ | CUTTER ANGLE | NO.OF EDGES | PERIPHERAL SPEED | FEED RATES |
|---|---|---|---|---|---|---|---|---|---|---|
| CENTERING | 4. | 0. | | | SPOT DRILL | | 90. | | 20. | 0.2 |
| DRILLING | 20. | 0. | 5. | 1 | DRILL | | 118. | | 20. | 0.41 |
| CHAMFERING | 22. | 20 | | | CHMF CUTTER | | 90. | 2. | 30. | 0.3 |

| CONTOUR | CTR-X | CTR-Y | RADIUS | ANGLE | | | | | | |
|---|---|---|---|---|---|---|---|---|---|---|
| BOLT HOLE CIRCLE | 100. | 80. | 50. | 45 | NO | | | | | |
| | | | | | 4 | | | | | |

LINE CTR MACH-ING UNIT

| MACH-ING UNIT | DEPTH | MACHINED SURFACE ROUGHNESS |
|---|---|---|
| LINE CTR | 50. | ▽▽ |

| APRCH POINT | X | Y | INFEED | STOCK REMOVAL | TOOL NAME | NO. OF EDGES | PERIPHERAL SPEED | FEED RATES |
|---|---|---|---|---|---|---|---|---|
| | −20. | 0. | 3.5 | 2. | E-MILL | 2. | 28.5 | 0.06 |
| CONTOUR | X | Y | | 0 | U | V | α | |
| | 0. | 0. | | | | | | |
| STR LINE | 100. | 0. | | | | | | |
| STR LINE | 100. | 100. | | | | | | |
| ⌒CIRCLE | 50. | 100. | 25. | | | | | |

FIG. 33

FACE MILLING UNIT

| MACH-ING MODE | MACH-ING UNIT | FACE | DEPTH | STOCK REMOVAL | MACHINED SURFACE ROUGHNESS | | | | | |
|---|---|---|---|---|---|---|---|---|---|---|
| | FACE MIL | | 50 | 6. | ▽▽▽ | | | | | |

| | METHOD OF MACH-ING | | APRCH POINT X,Y | | TOOL NAME | TOOL ⌀ | NO. OF EDGES | PERIPHERAL SPEED | FEED RATES |
|---|---|---|---|---|---|---|---|---|---|
| ROUGH MACH-ING | RECIPROCATING X | | 200, 200 | | F-MILL | 75 | 4 | 100 | 0.3 |
| FINISH MACH-ING | ONE DIRECTION X | | 200, 200 | | F-MILL | 75 | 4 | 140 | 0.2 |

| CONTOUR | CTR X | CTR Y | RADIUS |
|---|---|---|---|
| CIRCLE | 500. | 600. | 200. |

METHODS OF ENTERING MACHINING INFORMATION AND DISPLAY THEREFOR IN A NUMERICALLY CONTROLLED MACHINE TOOL

BACKGROUND OF THE INVENTION

1. Field of the Invention

The present invention relates to methods of entering machining information and display therefor in a numerically controlled machine tool.

2. Description of the Prior Art

In a machining center as is shown in FIGS. 1 and 2 each of tools 2 encased in a magazine 1 is conventionally set in order on a spindle 4 through a tool changer 3 and used to machine a workpiece on a X-Y table 5 in response to a control panel 6 operation and subsequent commands from a control unit 7. Preparation of machining information to be entered into a numerical control unit of the machining center 8 requires development of machining elements, on a 'tool' basis as shown in FIG. 3, which are specified by machining patterns of a finish contour shown in an engineering drawing, such as machining elements of centering, drilling and chamfering as to a drill hole machining, as well as translation of selection of tools, movement of the tool and machining order corresponding to a cutting configuration and the like into a language which the numerical control unit can decode. Drawing information can be translated into the machine language only by an adequately experienced programmer having substantial technical knowledge. Furthermore, the machine language, which is little associated with the drawing information, is apt to be wrongly entered. Machining information required by the numerical control unit is so much more and more complex than the drawing information of the workpiece, that programming is a time-consuming labor. Thus, in entering machining information, programming, which requires a great deal of time for a professional programmer, must be done in advance at offline status of machine.

The prior art, in trying to overcome the disadvantages, has employed an automatic programming of the machining information by the drawing information and other complementary information, in which also a specific programming language is used. Considerable training will be required to comprehend such a language and consequently a professional programmer is required. The machining information thus prepared must be ultimately translated into a language which the numerical control unit can decode, so that such a programming is usually done at offline status of machine. Furthermore, programming for a simple machining drawing which will be simple in itself may become complex, as a certain procedure must be taken, whether the machining drawing is simple or complex. In a method for eliminating these problems, machining information may be entered directly into a computer through a console key board. In this method, however, the finish machining contour is to be sequentially developed by every machine element on the 'tool' basis, and the machining information thus developed is entered in machining order, which operation is considerably complex. Furthermore, when a certain machining is repeated several times in the drawing, the machining information specified by each machining element must be entered repeatedly at the corresponding times. Thus, operation of entering the information becomes disadvantageously complex to incur the risk of wrong information input as well as to require considerable hours.

In a numerically controlled machine tool, especially in a numerically controlled machine tool into which machining information of a workpiece is entered through a control panel, a number of manual control switches are required to suit the respective information inputs, resulting in requirement of a large control panel and the possibility of wrong operation of the machine.

In order to overcome these defects, the prior art has proposed the use of a push-button control switch with switching mechanism, that is a control switch to which a plurality of functions are allotted, to reduce the number of the control switches. It is true the control panel becomes smaller, but at the same time control becomes more complicated, inducing control error, and also the control circuit is so complicated to cause wrong operation and to make circuit check as well as maintenance more difficult.

As the numerical control language for programming is only a symbol of each function, it is difficult to guess the original function or operation from it. As the program check is also performed through the above-mentioned difficult language, it required considerable hours and hard labor, and furthermore, errors, if any, will be difficult to be detected.

SUMMARY OF THE INVENTION

It is the principal object of the present invention to provide a method of controlling a numerically controlled machine tool having the steps of classifying finish machining contour elements shown in a drawing into the predetermined specific machining patterns and entering the machining information by the unit of the machining pattern into the numerically controlled machine tool, that is to provide, for example, a method of entering machining information into a machining center having the steps of classifying finish machining contour elements in the drawing into specific machining patterns determined by respective machining modes of point, line and face and entering the machining information as a unit of machining patterns into the machining center.

It is another object of the present invention to provide a method of entering control information for a numerically controlled machine tool in which a small number of control switches are used to enter a number of information exceeding the number of the control switches into a numerical control unit, without incurring any control error.

It is a further object of the present invention to provide a method of displaying machining conditions for a numerically controlled machine tool in which programming check and tool path are displayed on a display unit in colors specified by respective tools or machining patterns.

The invention will become more fully apparent from the claims and the description as it proceeds in connection with the drawings.

BRIEF EXPLANATION OF THE DRAWINGS

FIGS. 31 to 36 are views illustrating the display conditions of the machining units.

DESCRIPTION OF THE PREFERRED EMBODIMENT

Now a preferred embodiment of the present invention will be described, referring to FIGS. 4 to 36.

Figure 4:
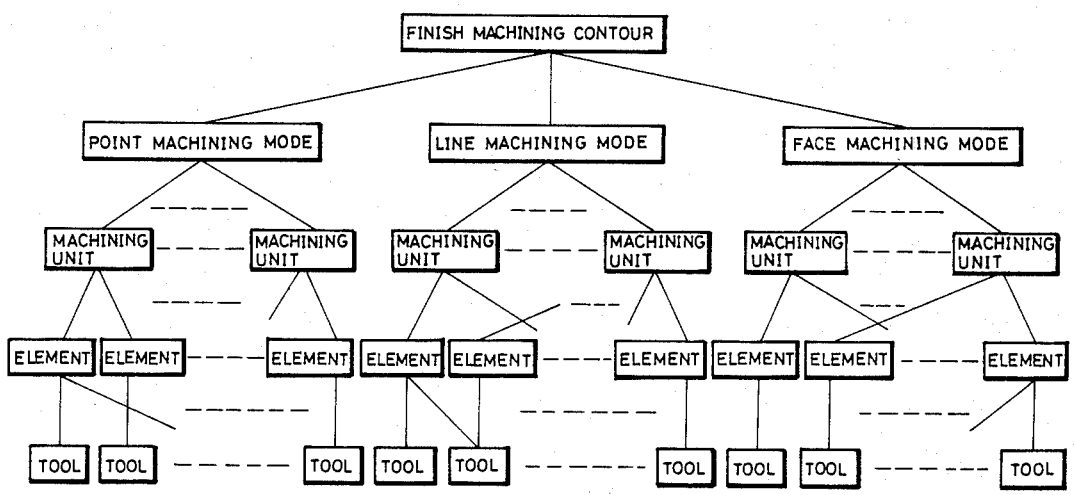
FIG. 4 is a machining classification diagram of a workpiece according to a preferred embodiment of the present invention.
Figure 5:
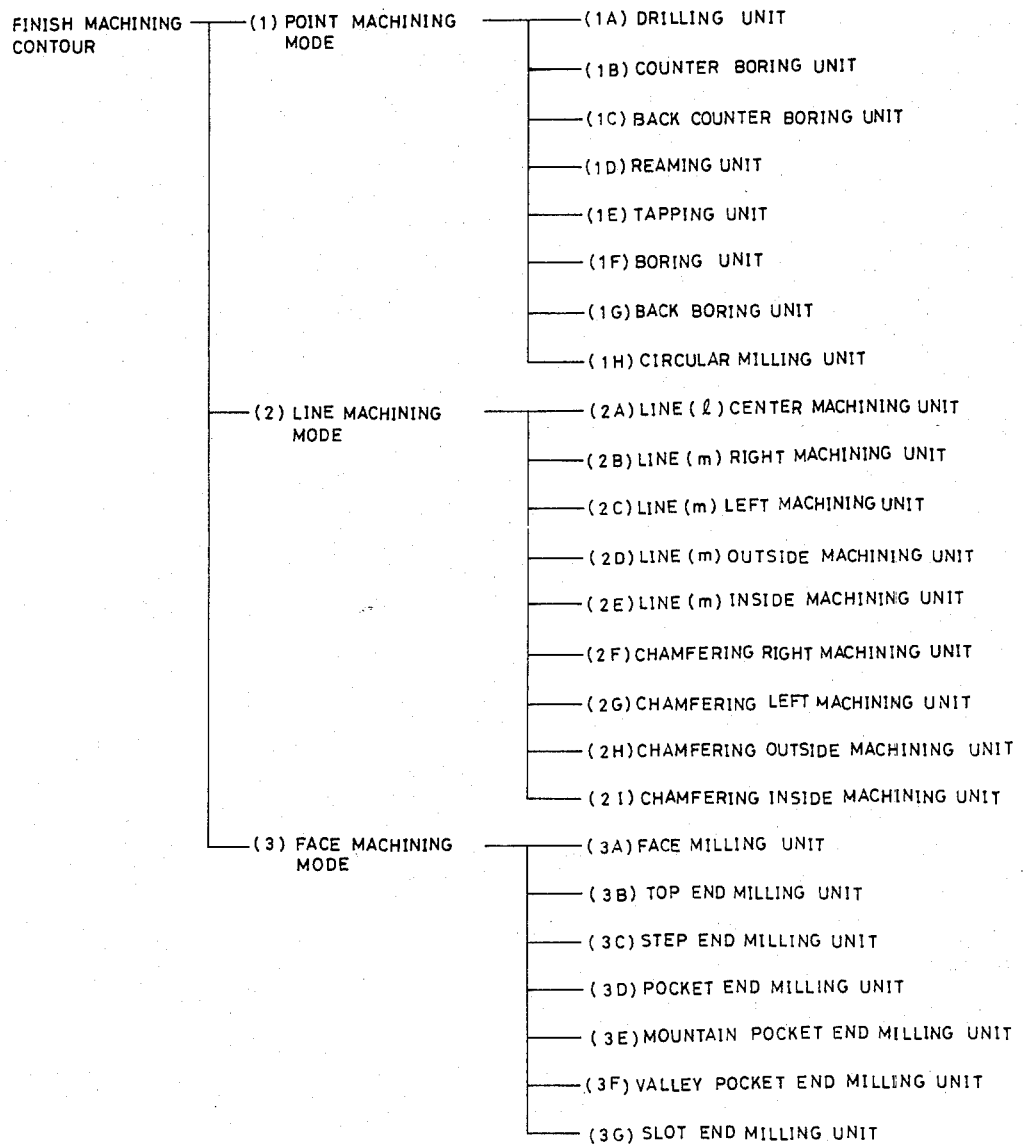
FIG. 5 is a detailed machining classification diagram of FIG. 4.

On systematically classifying machining patterns of a workpiece based upon a machining drawing, the machining configuration or the finish machining contour elements shown in the machining drawing is classified into any desired number of machining contour groups corresponding to a point machining mode using cutters such as drills, a line machining mode using cutters such as end mills and a face machining mode using cutters such as face mills, as is shown in FIGS. 4 and 5. Then the machining contour groups are classified by the respective machining modes into several machining units. The point machining mode is classified into machining units for machining the workpiece W by the cutters CT such as drills, as is shown in FIG. 5, 5-1A to 5-1H and FIGS. 6-1A to 6-1H. The line machining mode is classified into machining units for machining the workpiece W by the cutters CT such as end mills, as is shown in FIG. 5, 5-2A to 5-2I and FIG. 7, 7-2A to 7-2I. The face machining mode is classified into machining units for machining the workpiece W by the cutters CT such as face mills, as is shown in FIG. 5, 5-3A to 5-3G and FIGS. 8-3A to 8-3G.

Now, the method of numerical control using thus classified machining information will be explained.

Figure 9:
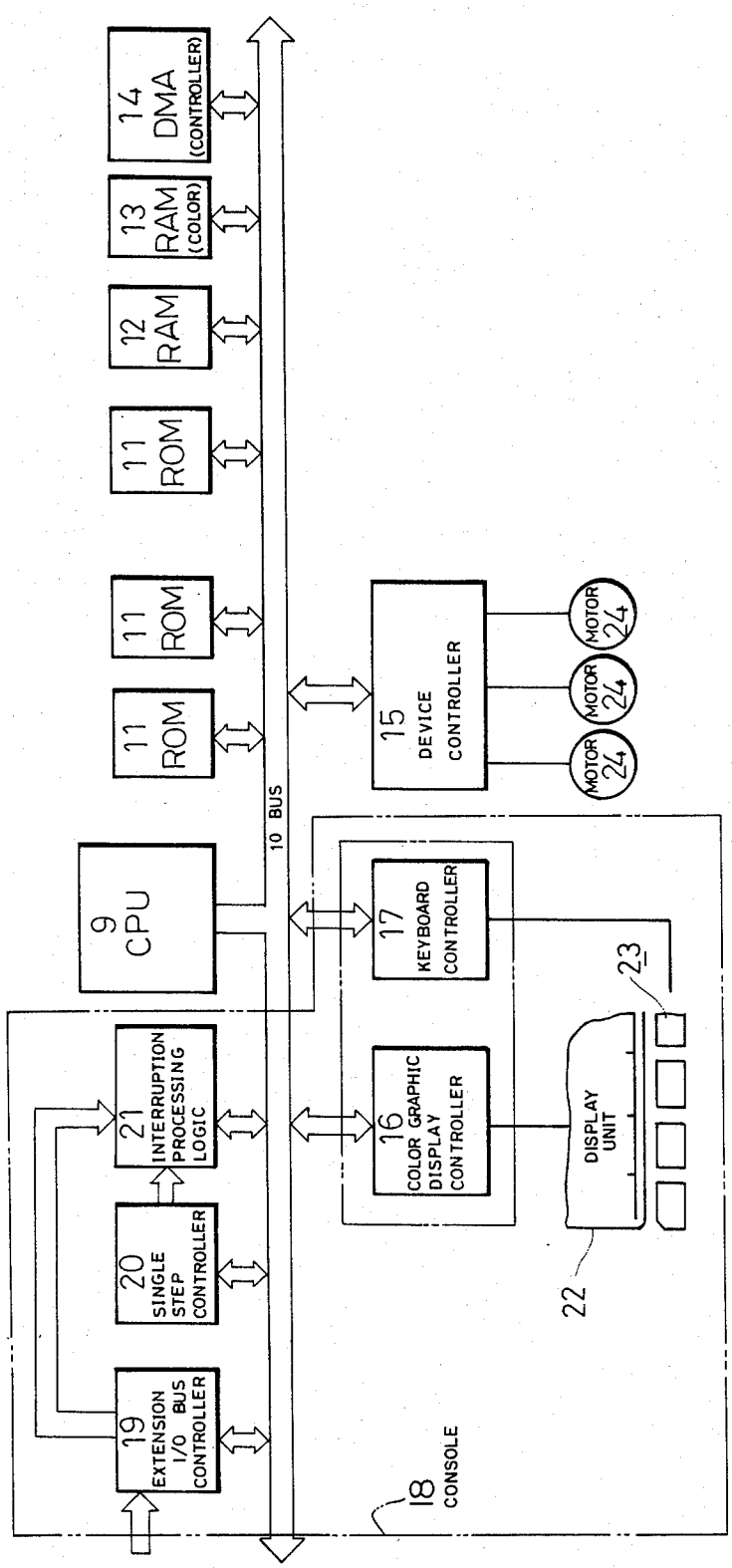
FIG. 9 is a system block diagram for a numerical control unit according to the embodiment of the present invention.

In FIG. 9 which is a system block diagram for a numerical control unit, a read-only memory 11 (or ROM 11), a dynamic random access memory 12 (or RAM 12) and a color information random access memory 13 (or RAM 13) which are storage cells are connected to a bus 10 from a central processor unit 9 (or CPU 9). There are also provided a direct memory access (or DMA) controller 14, a device controller 15, a console 18 composed of a color graphic display controller 16 and a key board controller 17, an extension input/output bus controller 19, a single step controller 20 and an interruption logic 21 connected through the bus 10. Reference numeral 22 designates a display unit controlled by the color graphic display controller 16 and adapted to display the point, line or face machining and all other related functional information.

FIGS. 11 to 30 are the flow charts of microscopic control for a numerical control unit in the machining center 8 according to the embodiment of the present invention, which will be explained in the sequence that the control operations are to be conducted.

Figure 10:
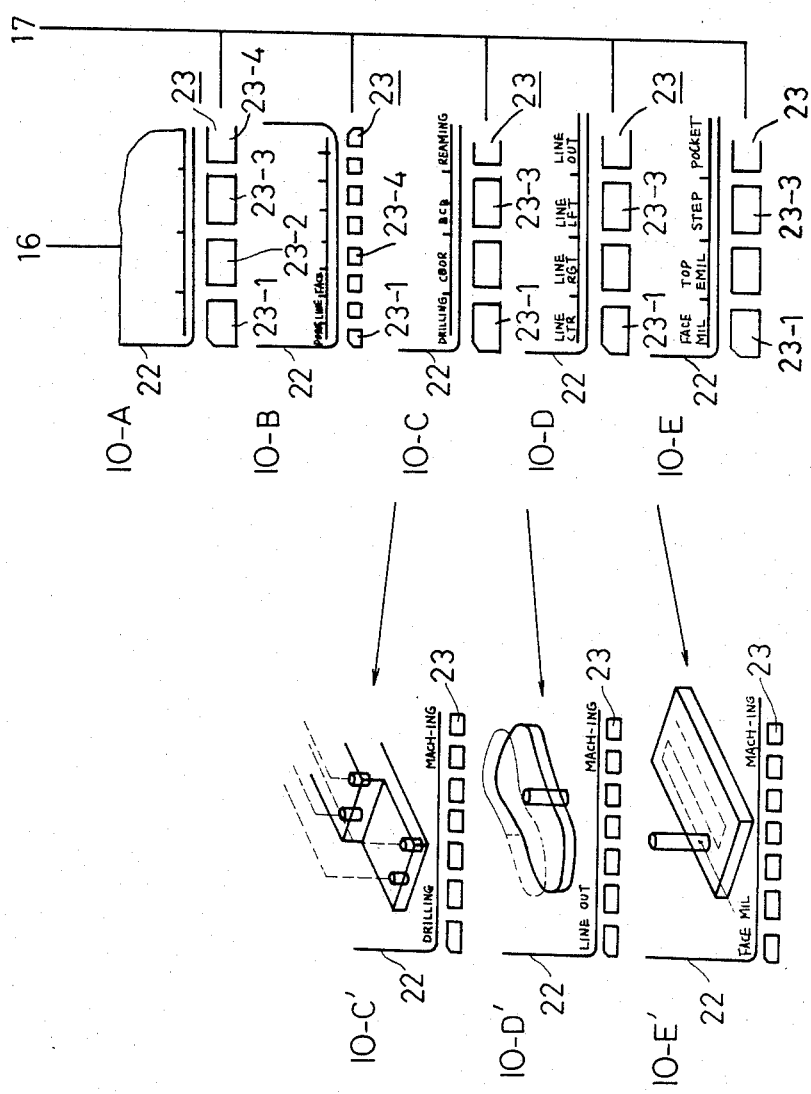
FIG. 10 which consists of FIG. 10-A to 10-E and 10-C' to 10-E' is a view illustrating changes in operation of the display unit in FIG. 9.
Figure 11:
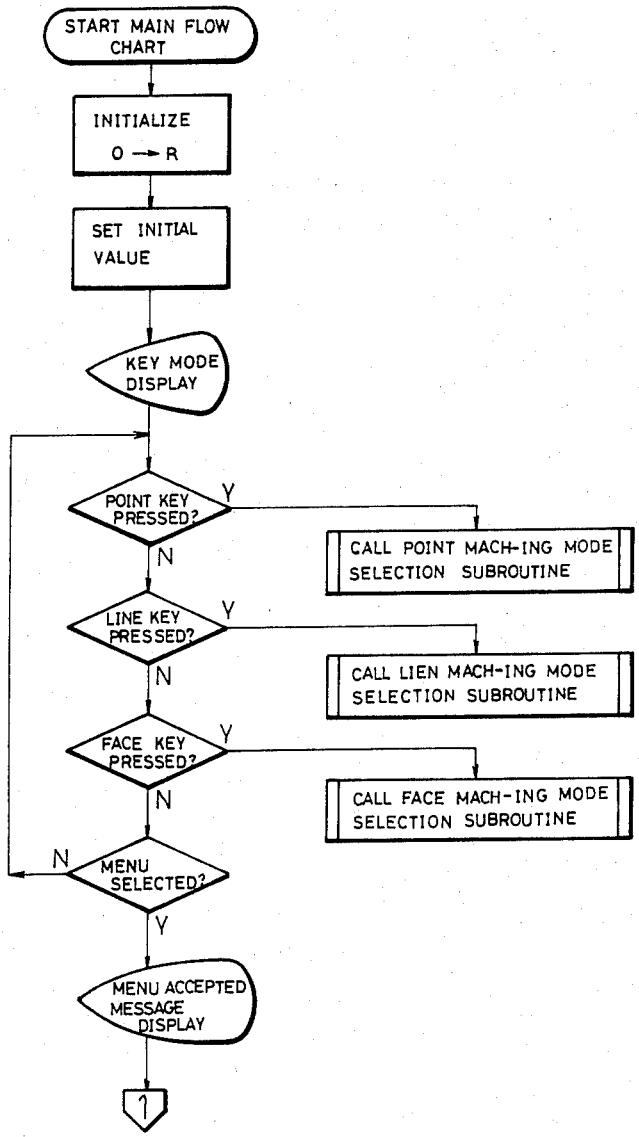
FIGS. 11 to 30 are flow charts of microscopic control of the unit.

When power is applied to the machining center 8 thus constructed, the system first performs initializing operation to clear away all of the machining status. When the initial value is stored in the random access memories RAM 12 and 13, the display unit 22 displays through the color graphic display controller 16 functional information (hereafter called menu) stored in the read-only memory ROM 11, or machining modes of the point machining mode, line machining mode and face machining mode in this case, as is shown in FIG. 10B in place of switching inoperative status as is shown in FIG. 10A. The operator presses a menu key or pushbutton switch 23-1, 23-2 - - - 23-n (hereafter indicated 23-i) on a key board responsive to the menu display for a desired purpose. When the key 23-i responsive to the point machining mode is pressed, the display unit 22 displays the machining units corresponding to FIG. 5, 1A to 1H and FIGS. 6-1A to 6-1H, as is shown in FIG. 10C. When the key 23-i responsive to the line machining mode is pressed, the display unit 22 displays the maching units corresponding to FIG. 5, 2A to 2I and FIGS. 7-2A to 7-2I, as is shown in FIG. 10, 10-D. When the key 23-i responsive to the face machining mode is pressed, the display unit 22 displays the machining units corresponding to FIG. 5, 5-3A to 5-3G and FIGS. 8, 8-3A to 8-3G, as is shown in FIG. 10, 10-E.

As the display unit 22 is displaying the machining units corresponding to the point, line or face machining mode, the operator presses the menu key 23-i responsive to a machining unit, such as "drilling", in the point machining mode. The display unit 22 displays data information as to drilling machining unit in response to the demand of functional operation, as is shown in FIG. 31 (character expression). In case the operator presses the menu key 23-i responsive to a machining unit, such as "line center machining", in the line machining mode, the display unit 22 displays data information as to line center machining unit in response to the demand of functional operation, as is shown in FIG. 32 (character expression). Similarly, in case the operator presses the menu key 23-i responsive to a machining unit, such as "face milling", in the face machining mode, the display unit 22 displays data information as to face milling unit in response to the functional operation, as is shown in FIG. 33 (character expression).

When the data information as is shown in FIG. 31, 32 or 33 is displayed, numerical data responsive to the respective information is entered through the key board 23 at the single-underlined values in FIG. 31, 32 or 33 in sequence of message. Now the number of revolutions of the motor 24, cutting conditions and the like responsive stored in ROM 11 at the double-underlined values in FIG. 31, 32 or 33.

Figure 12:
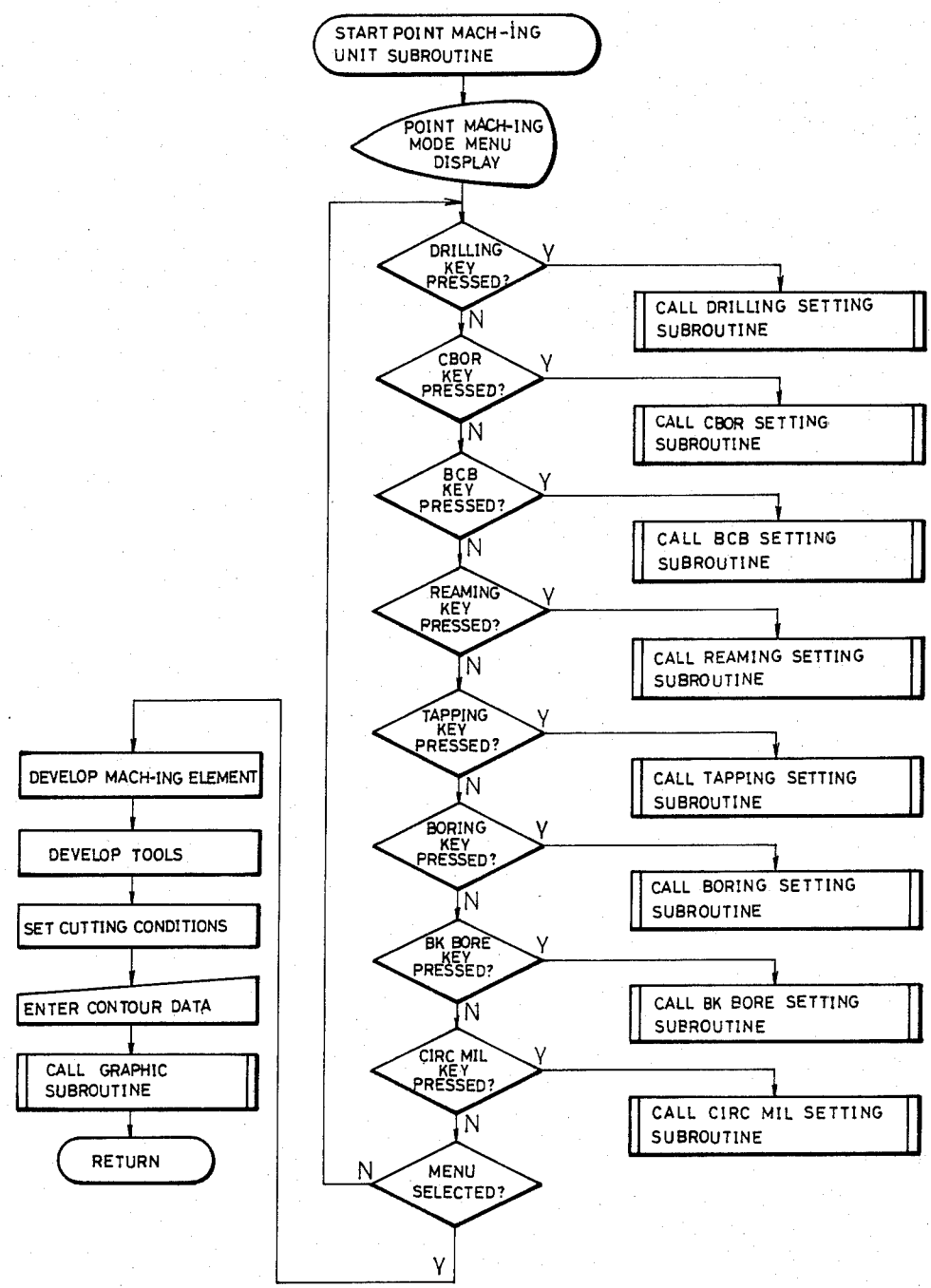

In other words, when the key responsive to, for example, the point machining mode is pressed, the software control branches to "point machining mode selection subroutine-call", and then it jumps to "point machining unit subroutine" shown in FIG. 12 and the display unit 22 displays, as is shown in FIG. 10C, the menu of the point maching mode, that is the menu of the respective machining units responsive to FIG. 5, 5-1A to 5-1H, and FIG. 6, 6-1A to 6-1A. When the key responsive to the line machining mode is pressed, the software control branches to "line machining mode selection subroutine-call" shown in FIG. 11, and then it jumps to "line machining unit subroutine" shown in FIG. 14, and the display unit 22 displays, as is shown in FIG. 10, 10-D, the menu of the line machining mode, that is the menu of the respective machining units responsive to FIG. 5, 2A to 5-2I and FIG. 7, 7-2A to 7-2I. When the key responsive to the face machining mode is pressed, the software control branches to "face machining mode selection subroutine-call" shown in FIG. 11, and then it jumps to "face machining unit subroutine" shown in FIG. 16 and the display unit 22 displays, as is shown in FIG. 10, 10-E, the menu of the face machining mode, that is the menu of the respective machining units responsive to FIG. 5, 5-3A to 5-3G and FIG. 8, 8-3A to 8-3G.

Figure 1:
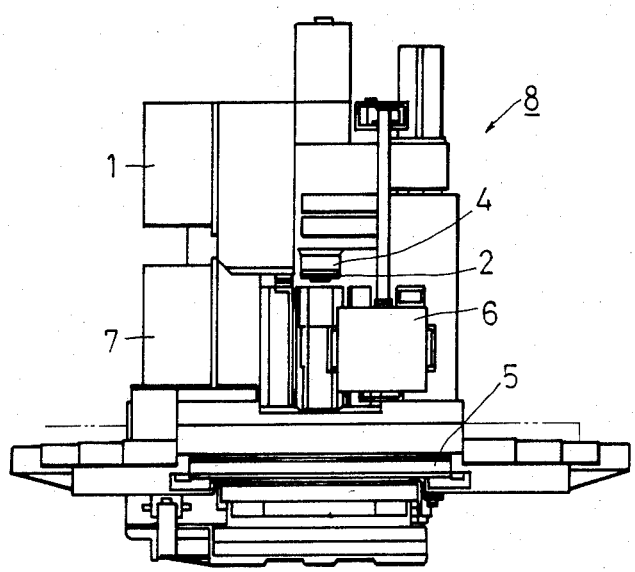
FIG. 1 is a front elevational view of a machining center common to a prior art and a preferred embodiment of the present invention.
Figure 2:
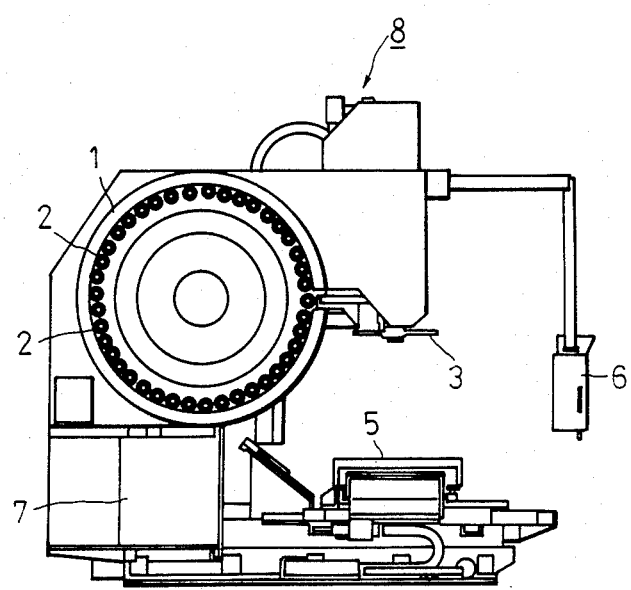
FIG. 2 is a side elevational view of the machining center in FIG. 1.
Figure 3:
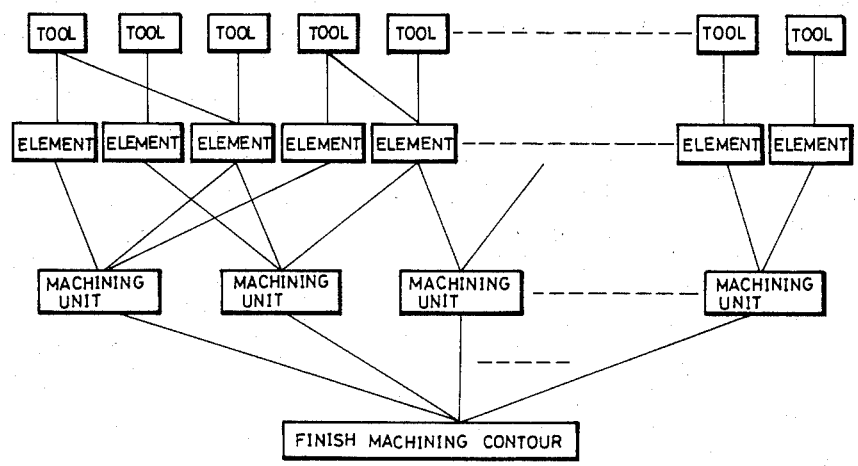
FIG. 3 is a conventional machining classification diagram of a workpiece.
Figure 6:
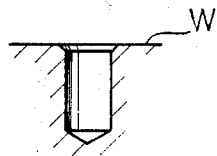
FIG. 6 which consists of FIGS. 6-1A to 6-1H are views illustrating machining units in the point machining mode corresponding to 1A to 1H in FIG. 5, respectively.
Figure 6:
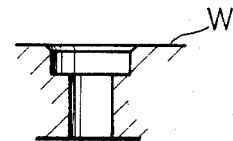
Figure 6:
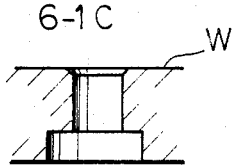
Figure 6:
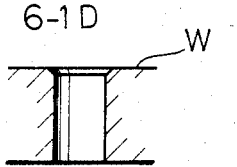
Figure 6:
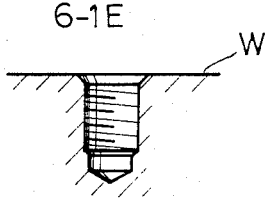
Figure 6:
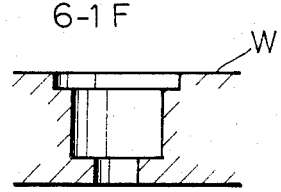
Figure 6:
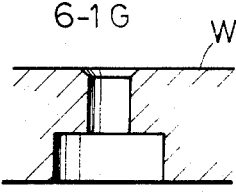
Figure 6:
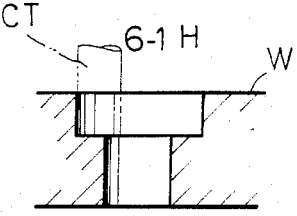
Figure 7:
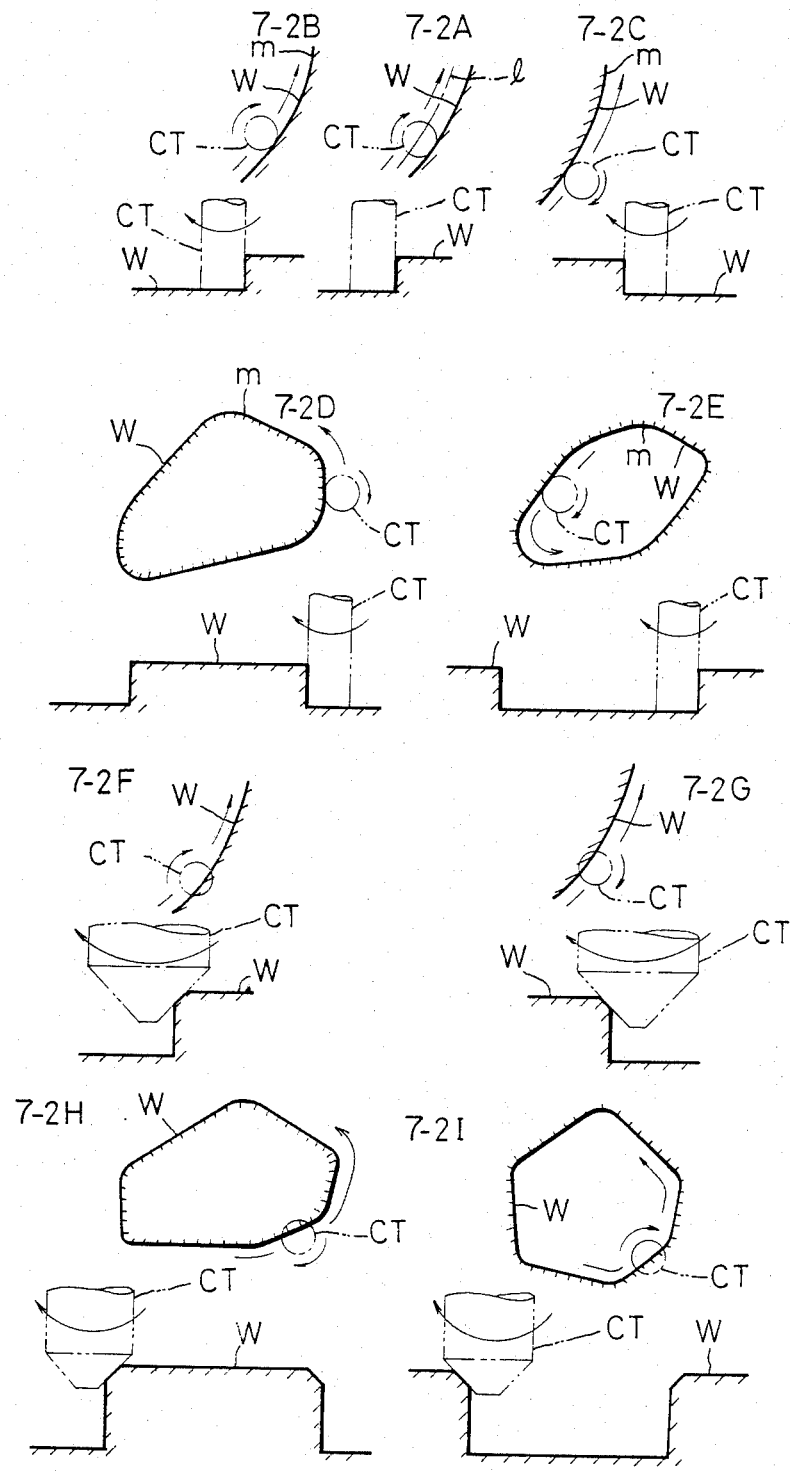
FIG. 7 which consists of FIGS. 7-2A to 7-2I are views illustrating machining units in the line machining mode corresponding to 2A to 2I in FIG. 5, respectively.
Figure 8A:
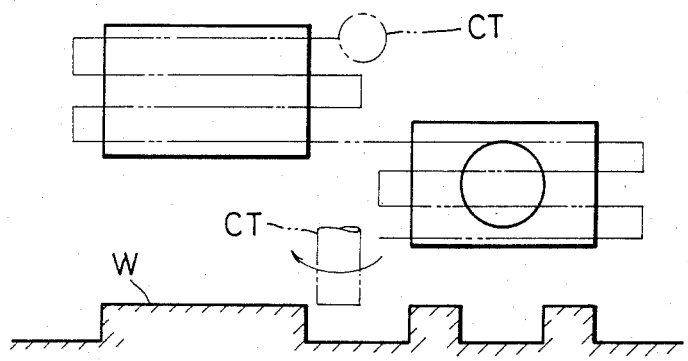
FIG. 8, which consists of FIGS. 8A and 8B which in turn consist of FIGS. 8-3A to 8-3G are views illustrating machining units in the face machining mode corresponding to FIGS. 5-3A to 5-3G in FIG. 5, respectively.
Figure 8A:
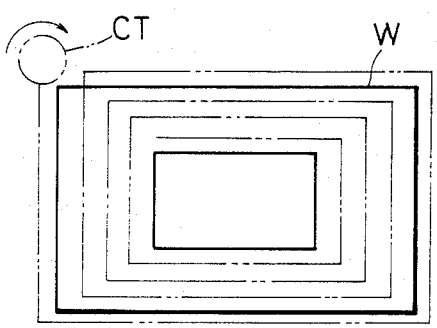
Figure 8A:
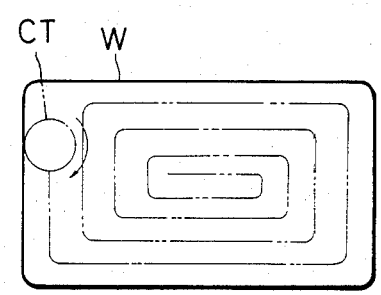
Figure 8A:
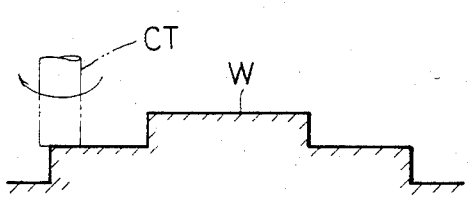
Figure 8A:
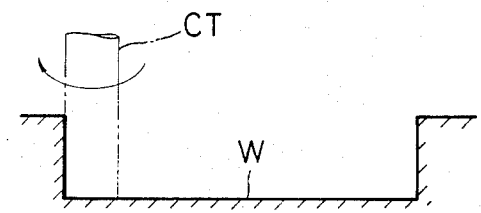
Figure 8B:
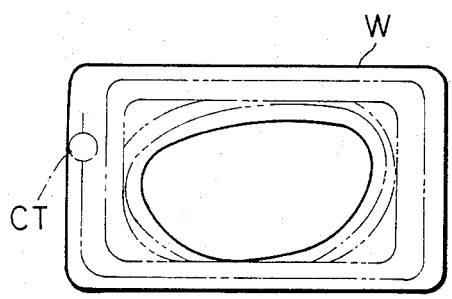
Figure 8B:
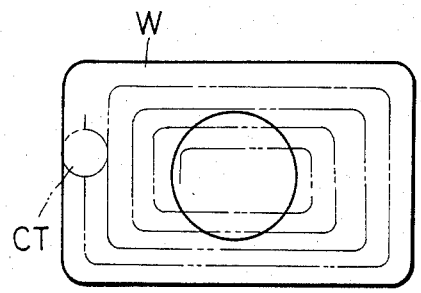
Figure 8B:
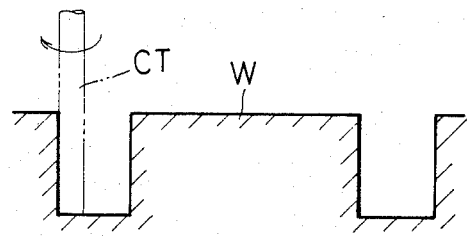
Figure 8B:
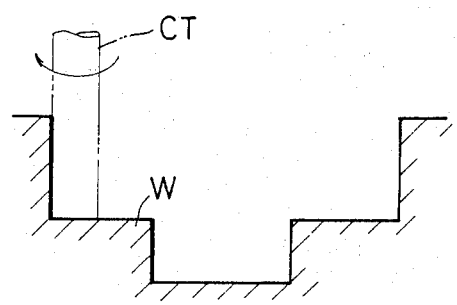
Figure 8B:
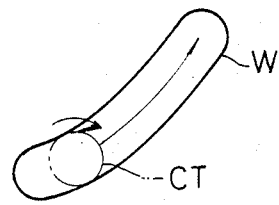
Figure 8B:
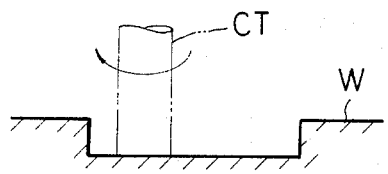
Figure 13:
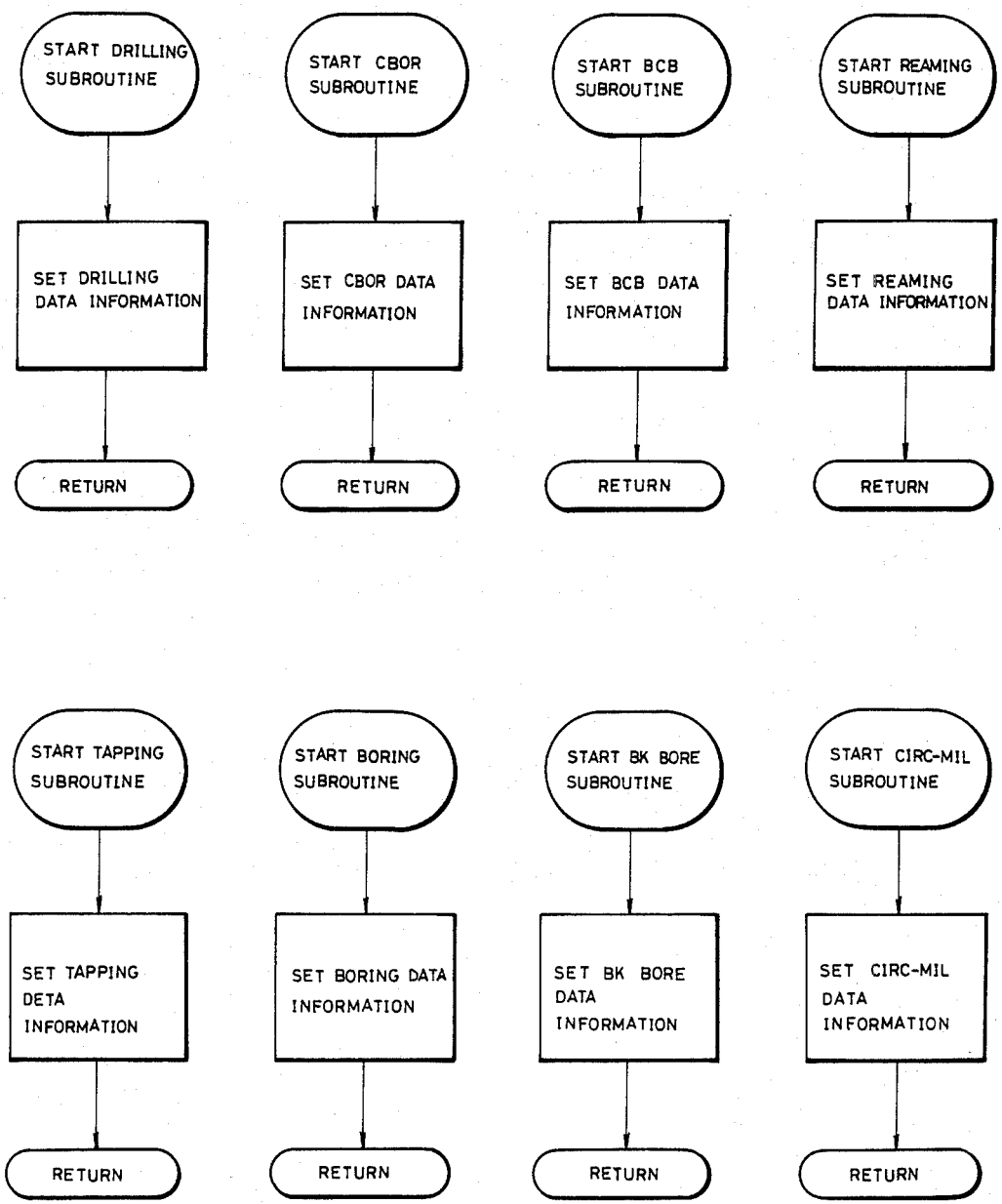
Figure 14:
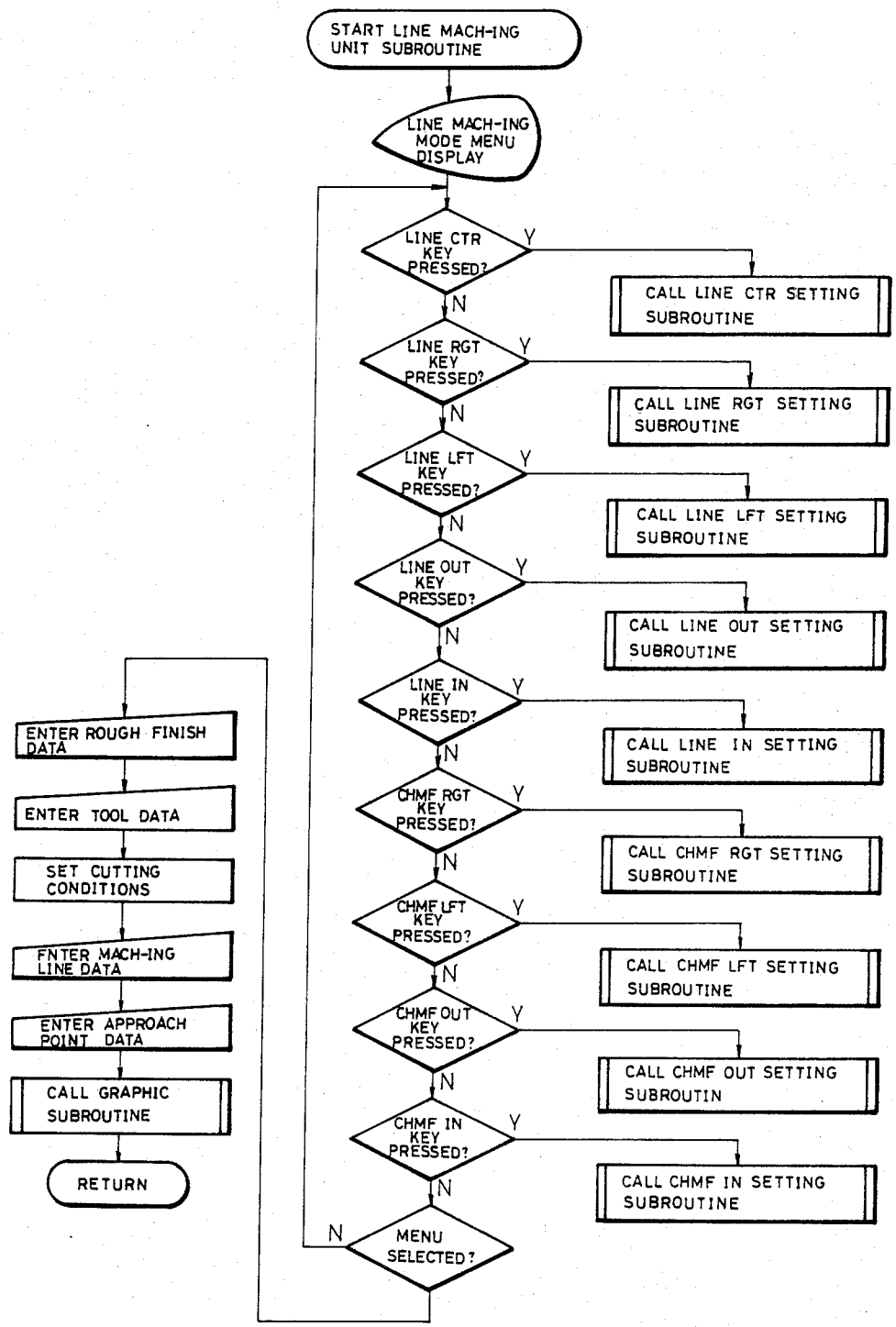
Figure 15:
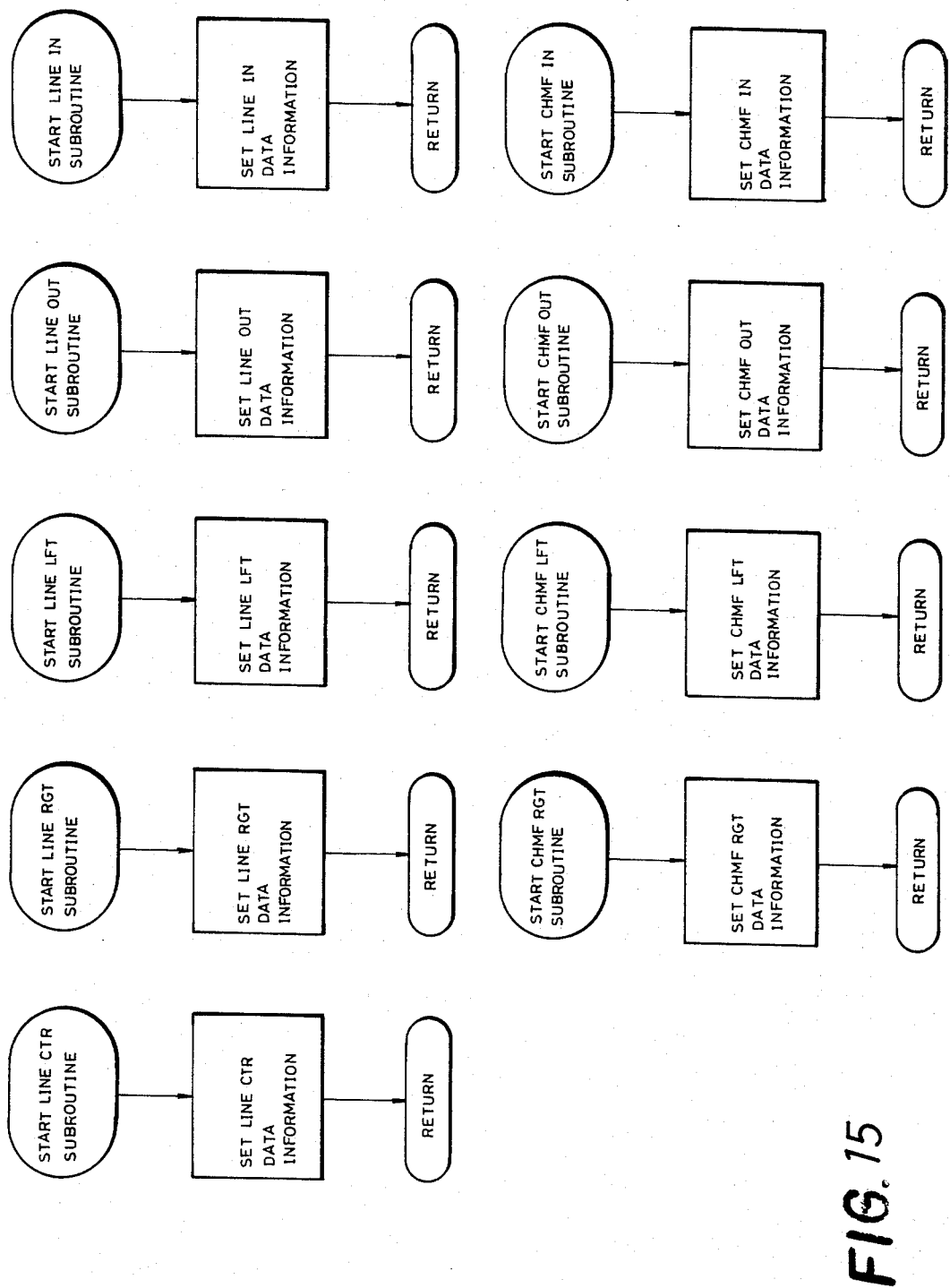
Figure 16:
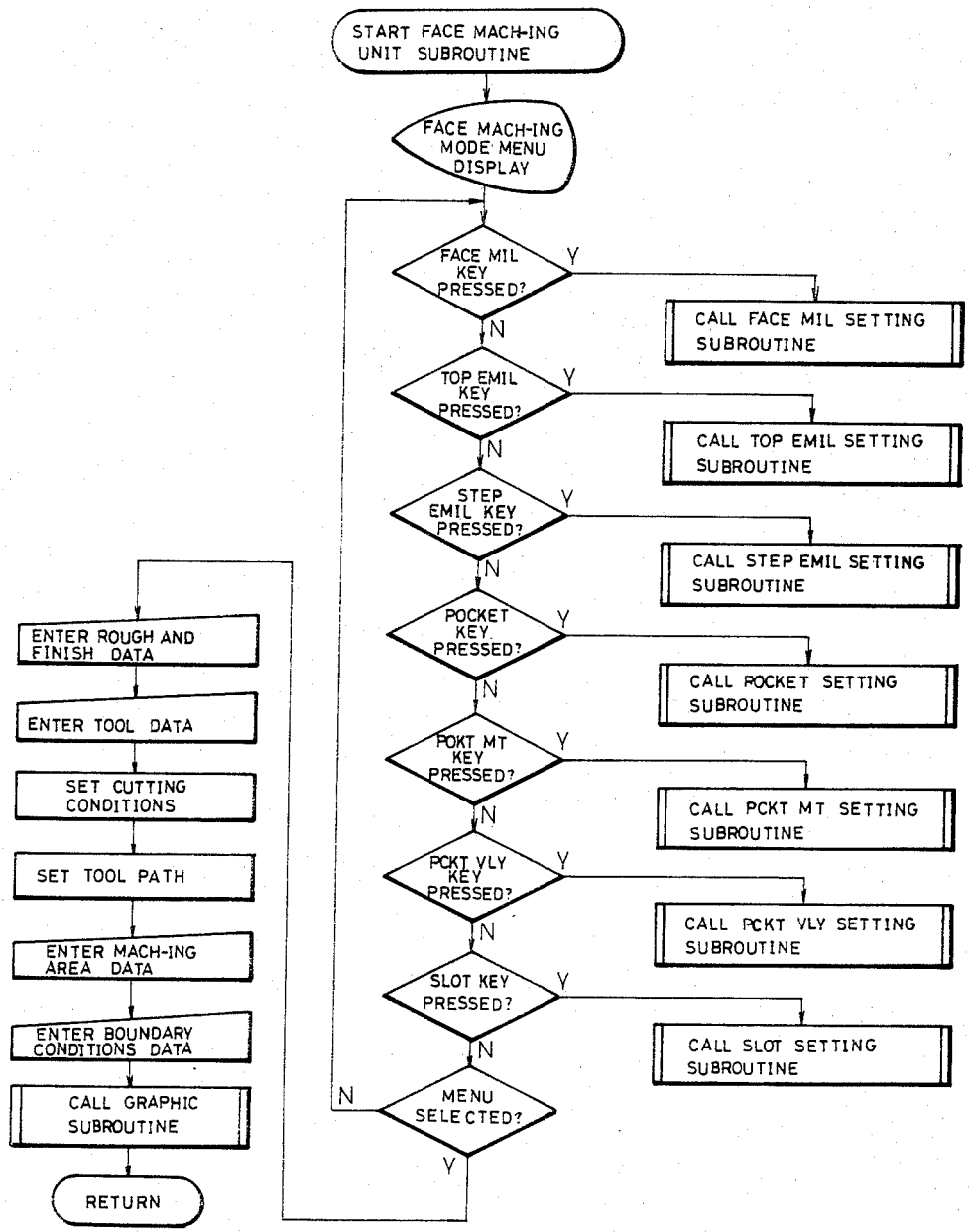
Figure 17:
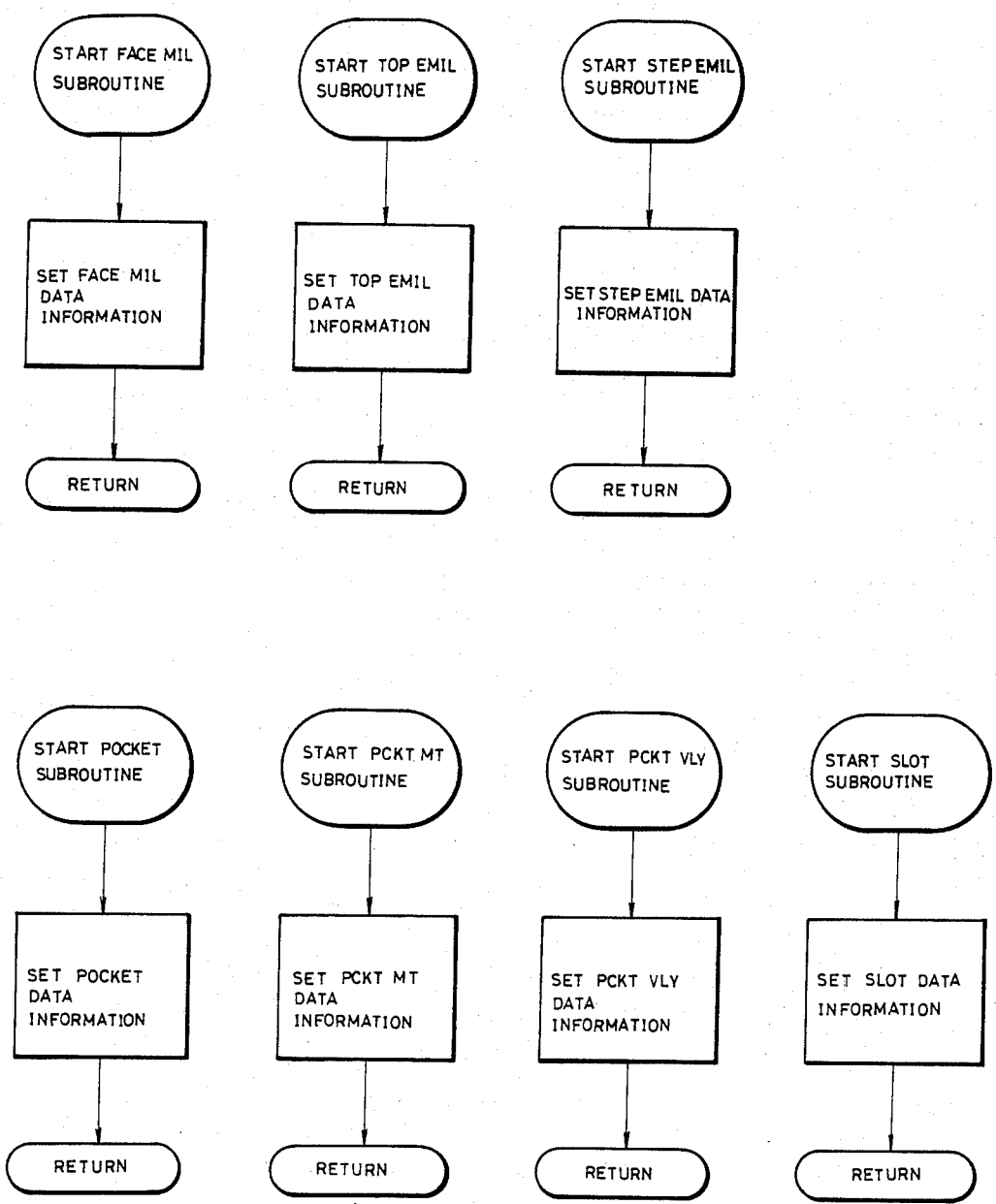
Figure 18:
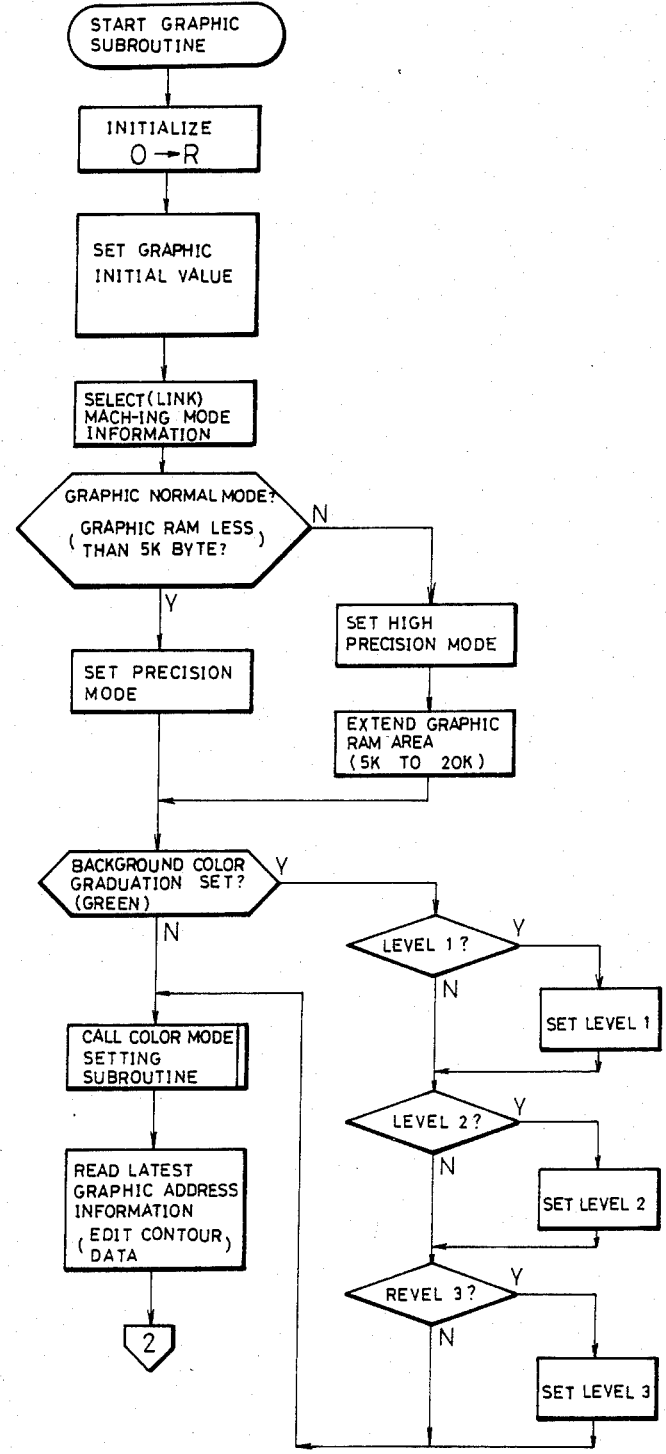
Figure 19:
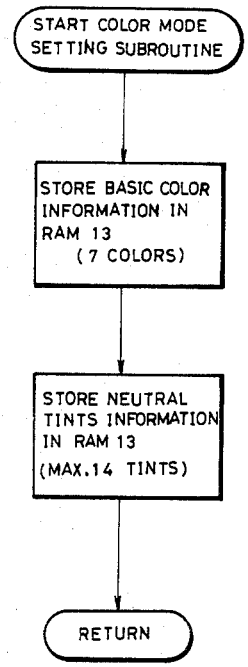
Figure 20:
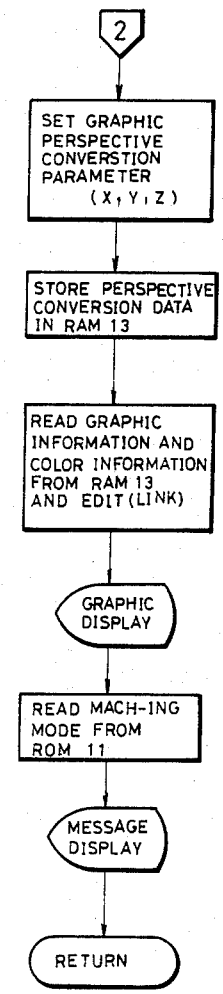

Then, the operator presses a menu key for a machining unit in the point machining mode, for example "drilling" corresponding to FIG. 5, line 1A (i.e., drilling unit) 1A and FIG. 6, 6-1A, the software control branches to "drilling unit setting subroutine-call" shown in FIG. 12, and then it jumps to "drilling unit subroutine" shown in FIG. 13, and the display unit 22 displays data information as to the drilling unit in response to the demand of functional operation as is shown in FIG. 31 (character expression). In the same way, when the operator presses a menu key for a machining unit in the line machining mode, for example "line center machining" corresponding to FIG. 5, line 2A (counter boring unit) and FIG. 7, 7-2A, the software control branches to "line center machining unit setting subroutine-call" shown in FIG. 14, and then it jumps to "line center machining unit subroutine" in FIG. 15, and the display unit 22 displays data information as to the line center machining unit in response to the demand of functional operation as is shown in FIG. 32 (character expression). When the operator presses a menu key for a machining unit in the face machining mode, for example "face milling" corresponding to FIG. 5, line 3A (face milling unit) and FIG. 8, 8-3A, the software control branches to "face milling unit setting subroutine-call" shown in FIG. 16, and then it jumps to "face milling unit subroutine" shown in FIG. 17, and the display unit 22 displays data information as to the face milling unit in response to the demand of functional operation as is shown in FIG. 33 (character expression).

When the data information as is shown in FIG. 31, 32 or 33 is displayed, numerical data corresponding to the respective information are entered through the key board 23 at the single-underlined values in FIG. 31, 32 or 33 in sequence of message. Now, the microsoft control returns to the main routine at an address added 1 (plus one) to the original address and, when "graphic subroutine" is called just after a series of operation of, for example, the point machining mode, the graphic system at first performs initializing operation (write "0" in RAM 13) to clear away all of unnecessary information. After an initial value is stored in the random-access memory RAM 13, the point machining mode information, for example, is linked with graphic information (address) and then the area in RAM 13 in which contour information and machining information are written is automatically decided whether it is more or less than 5K byte. In case of less than 5K byte, a precision mode is set and in case of more than 5K byte, a high precision mode is set and the graphic RAM area is automatically extended up to a maximum of 20K byte. The operator can select the graduation of the display background color (green) at three levels. When the operator sets level 1, the background color (green) is set pale and the control branches to "color mode selection subroutine-call".

Now color information is set for character and graphic to be displayed on the display unit 22. The color information (seven colors) are stored in RAM 13, and further neutral tints information (up to a maximum of fourteen tints) are stored in the RAM 13, and the main routine is called again. Then, in order to use as active information later, the latest graphic address information, that is contour data, is edited and after the perspectively-converted graphic parameter (X, Y, Z) are set, they are sorted and linked with the contour data and then stored again in the RAM 13.

The perspectively-converted data is linked with color information sequentially by one byte and graphically displayed as is shown in FIG. 10, 10-10C; 10-10D; and 10E'.

When the CPU 9 reads the process of the display area, the contents of the storage RAM is registered in the CPU 9 through data bus and the data at the address corresponding to the color RAM is registered in a color register. When the CPU 9 writes the process in the display area, the data in the CPU 9 is written in the storage RAM and the contents of the color register is written in the color RAM. When the program is stored in the display area, a bit for masking is provided in the color register to prevent the contents of the color register from being destroyed when the CPU 9 communicates with the instruction.

Figure 21:
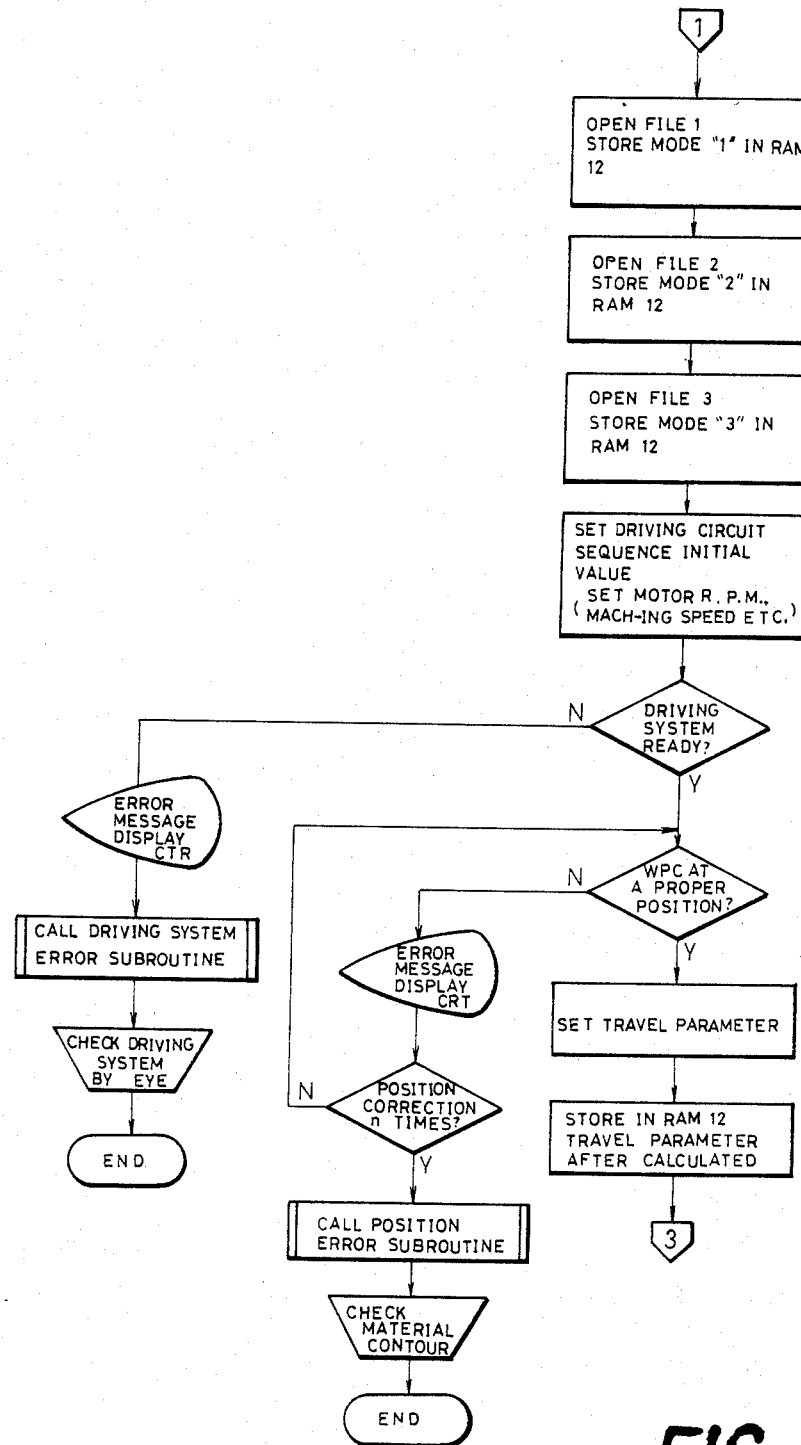
Figure 22:
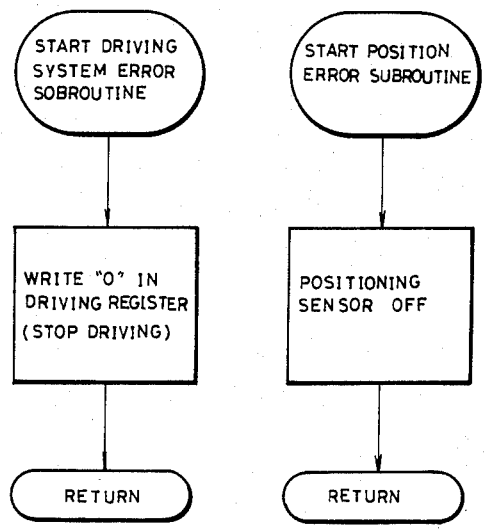
Figure 24:
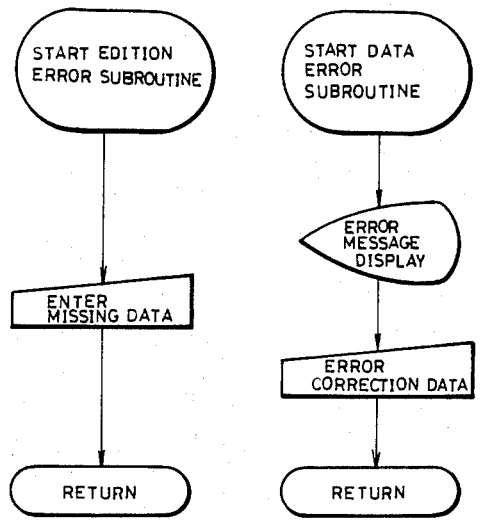

Then, the color mode designation is read from the ROM 11 and displayed in the left lower portion of the screen of graphic display. Control returns to the main routine and at that time program address register is counted up by one. After the display unit 22 displays the menu accepted message stored in the ROM 11, the CPU 9 opens stored mode data from files 1 to 3 in sequence, as is shown in FIG. 21, to re-store the objective mode data in RAM 12. Utilizing the data thus stored, an initial value of a driving circuit sequence, that is cutting conditions, such as revolutions of the motor 24 and cutting speed, are automatically set by the data previously stored in the ROM 11, and driving system preparation ready check and workpiece at a predetermined position check are carried out, and the motor 24 travel parameter is set and the motor 24 travel parameter is calculated.

Figure 23:
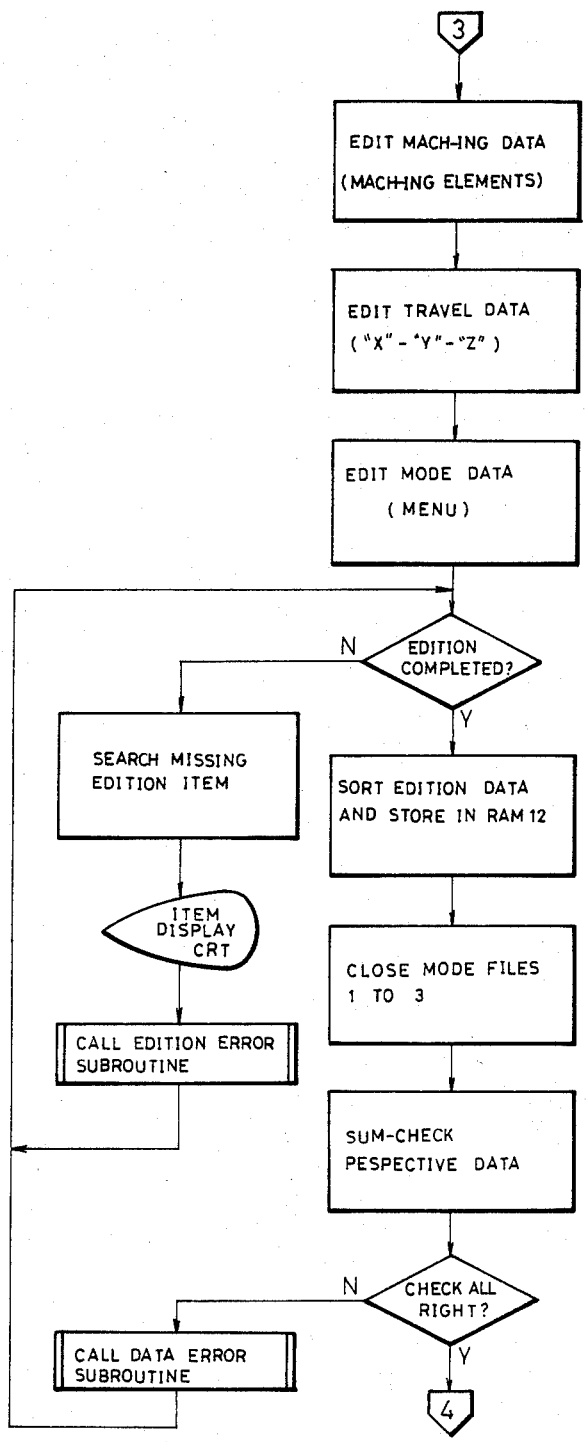
Figure 25:
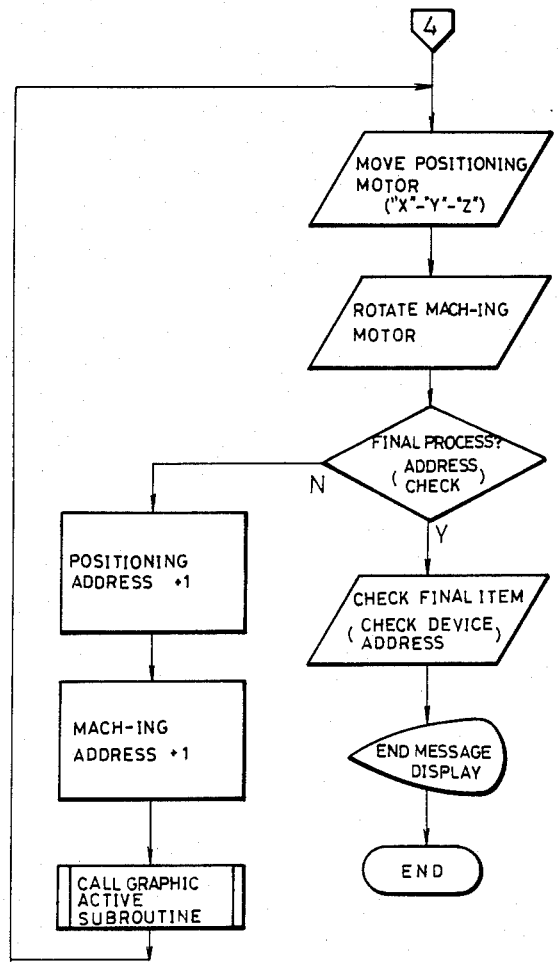
Figure 26:
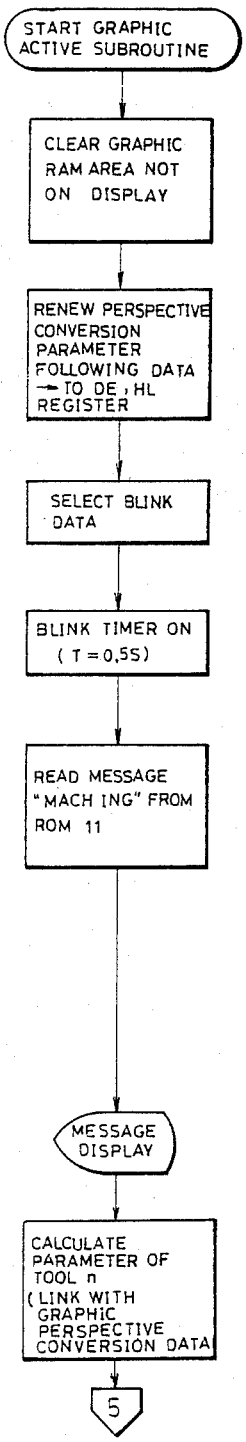
Figure 27:
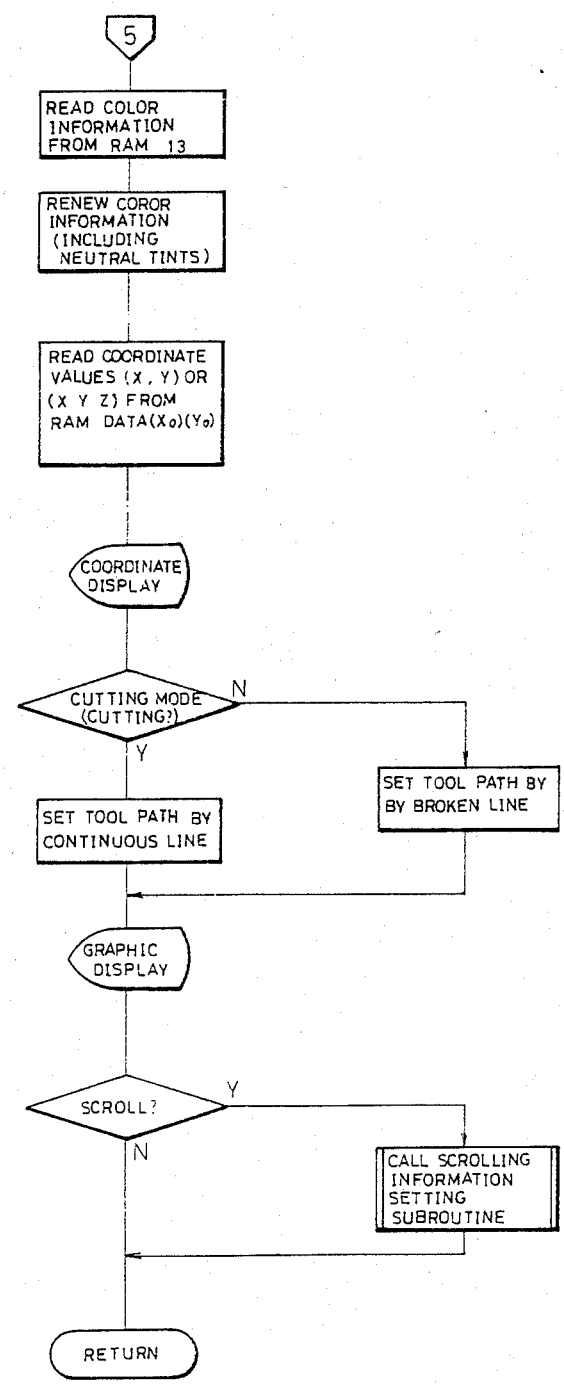
Figure 28:
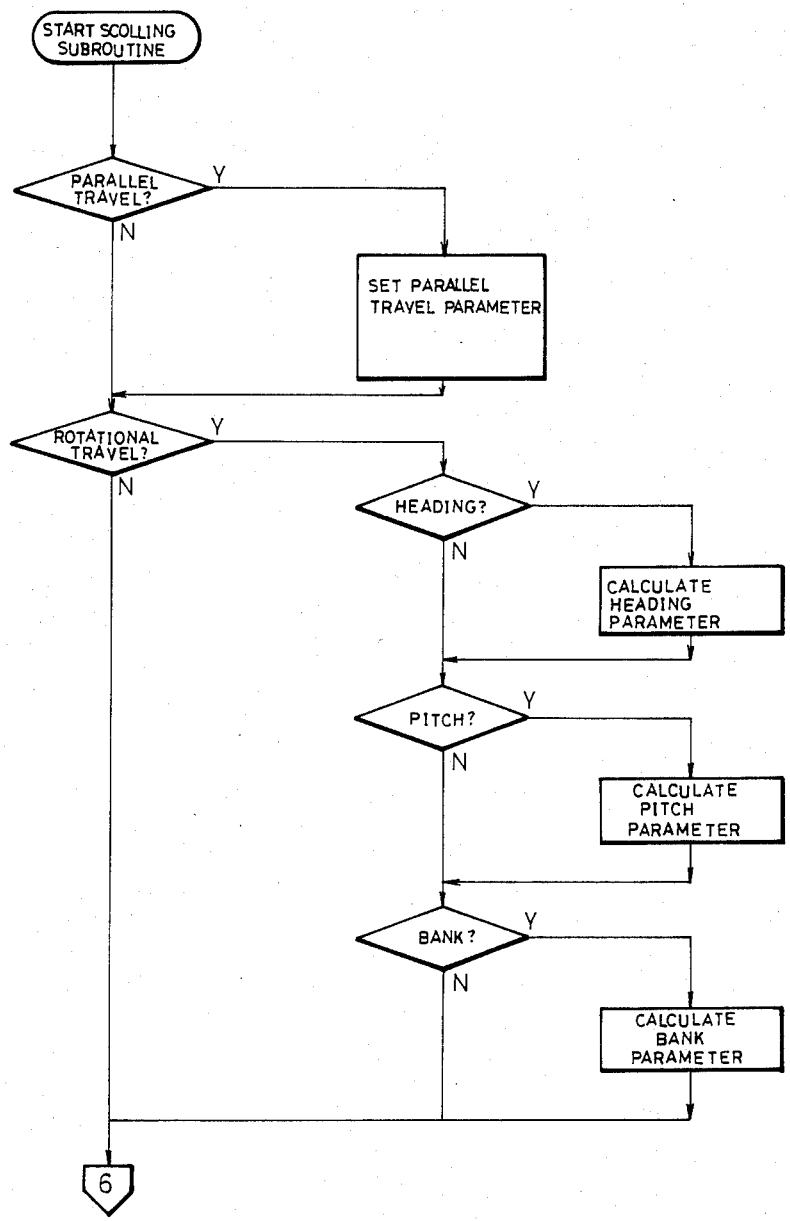
Figure 29:
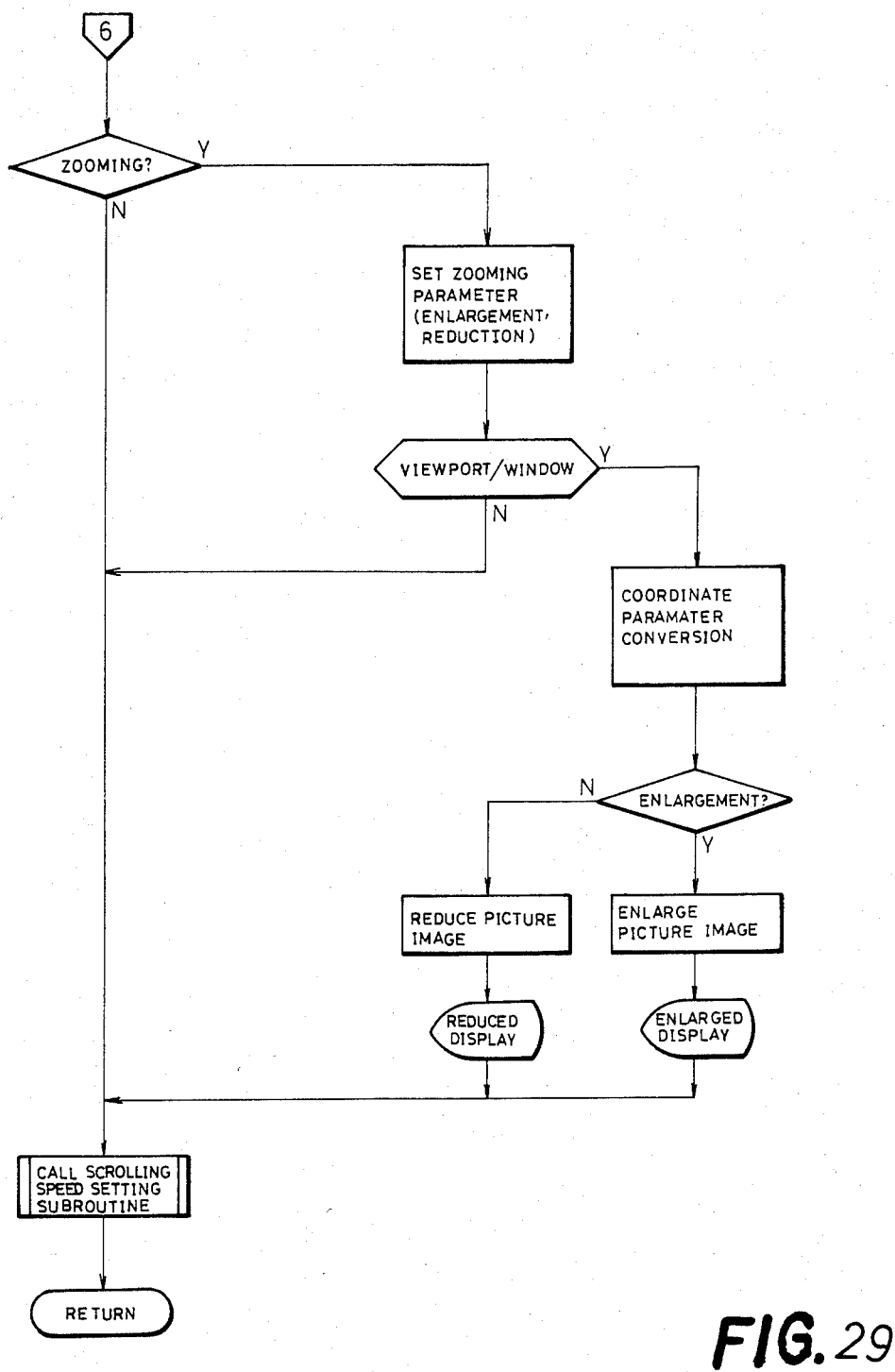
Figure 30:
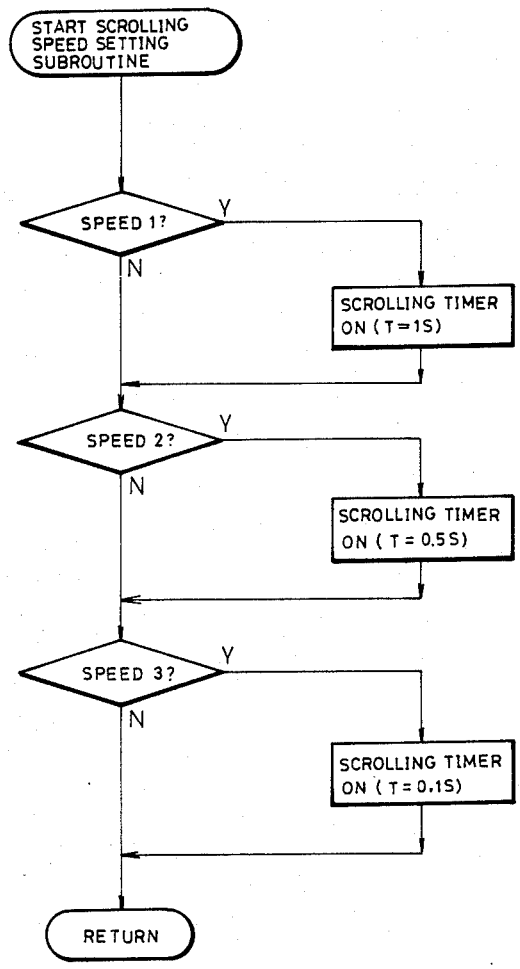

As is shown in FIG. 23, machining data (machining elements data), motor 24 travel data (X-Y-Z directions) and mode data are edited, and after the edition is checked, the edited data are all sorted and re-stored in RAM 12. Then, the mode data storing files are closed and the data is sum-checked. As is shown in FIG. 25, after the positioning motor 24 is driven and then the machining motor 24 is driven and graphic active subroutine is called, the graphic system first clears unnecessary display information, that is the graphic RAM area not on display (write "0" in the unnecessary area). Then, in order to synchronize the graphic to the cutting speed, the perspective conversion parameter already written in the random access memory RAM 13 is renewed, and the following graphic information (parameter) is once saved in DE and HL registers of the CPU 9 to protect the display information during machining operation.

In order to inform the operator of the position of the tool moved, the picture image of the tool is blinked by selecting tool picture image information and blinking the data by a blink timer (T=0.5S or thereabout). During machining operation, a message like "in operation" read from the ROM 11 is displayed in the right lower portion of the display unit screen, as is shown in FIG. 10, 10–10C; 10–D; and 10–10E, to show the operation that machining is going on.

Figure 34:
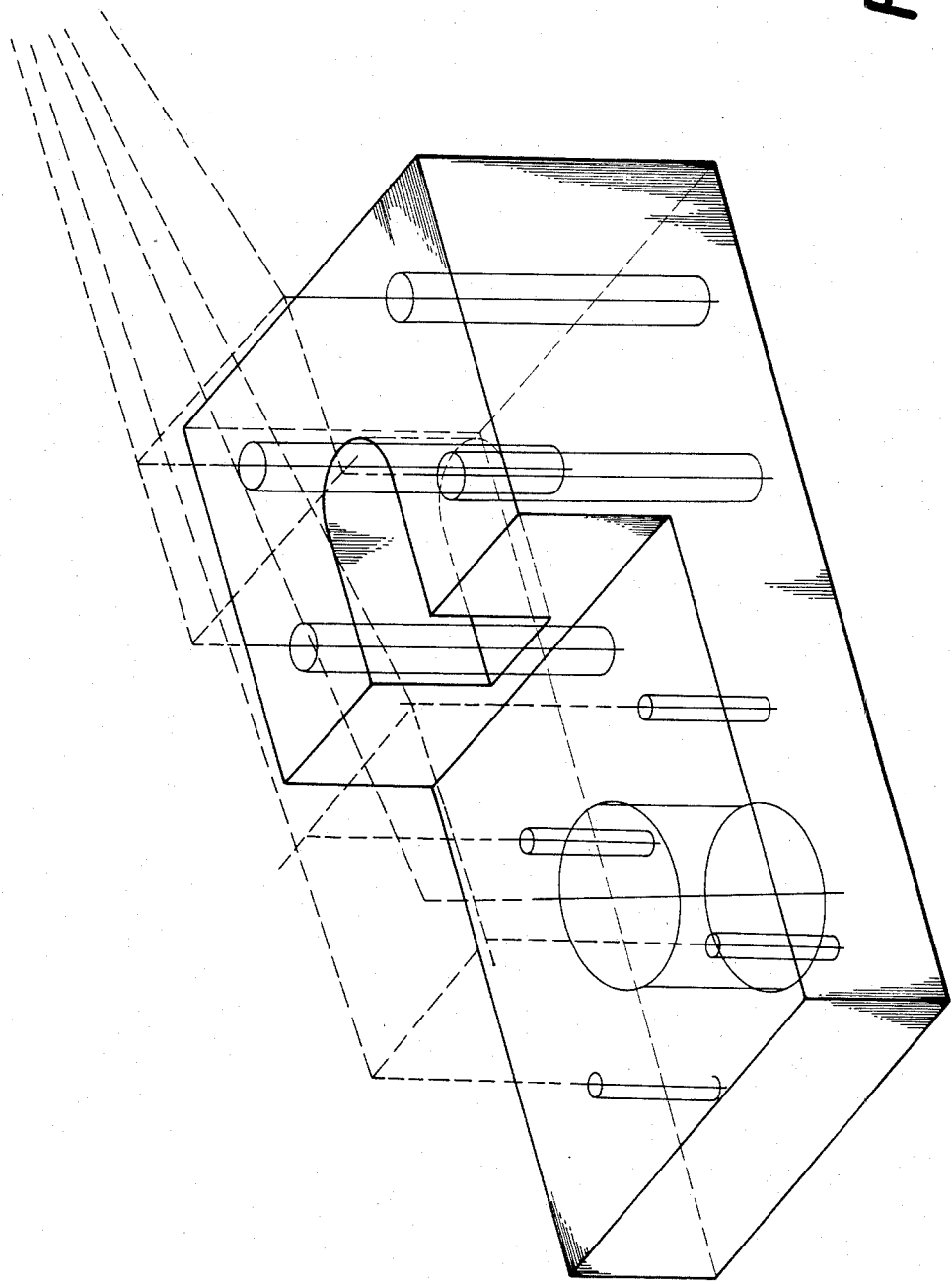
Figure 35:
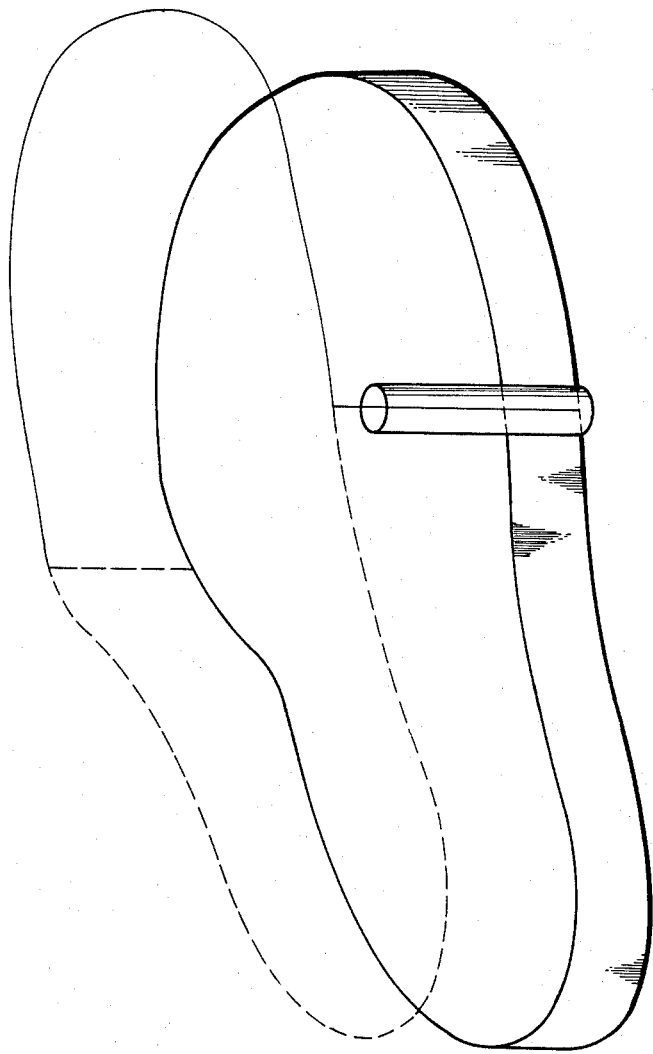
Figure 36:
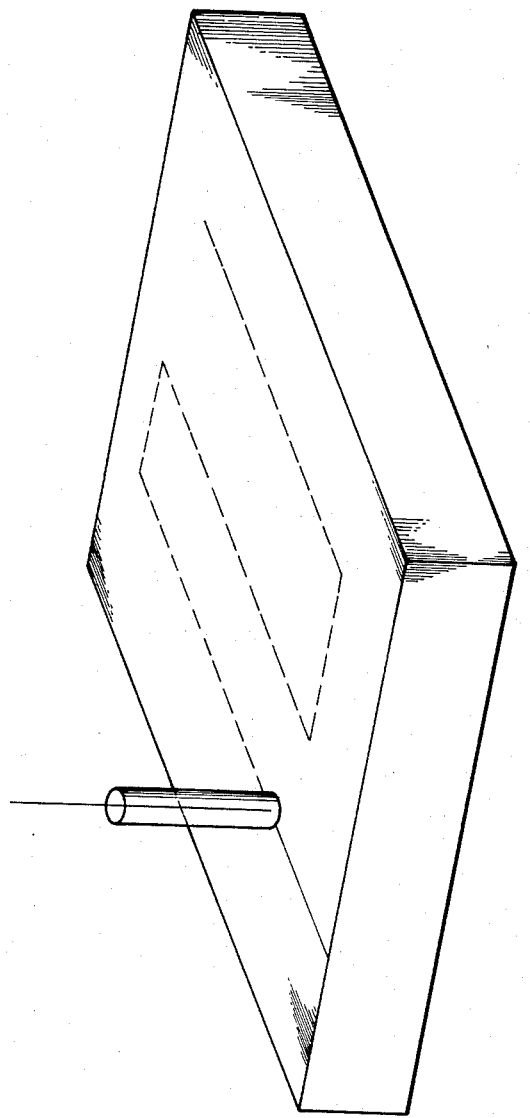

Then, the parameter of a tool used, such as a drill, is calculated and linked with graphic perspective conversion data, and color information is read from the RAM 13. The color information is output by a step in sequence from the lower address of the RAM 13 so as not to lap the color information used in the preceding machining path. Then coordinate values for machining, that is X and Y in case of two dimensions and X, Y and Z in case of three dimensions are read from the RAM 13 and displayed in the upper central portion of the display unit screen. In case the cutting mode decision is yes (Y), the tool path is set by a continuous line and displayed, as is shown in FIG. 31, and in case of no (N), the tool path is set by a broken line and displayed as is shown in FIG. 34. In case of line machining, the tool path is displayed as is shown in FIG. 35, and in case of face machining, it is displayed as is shown in FIG. 36.

When the picture image in perspective is scrolled, control branches into scrolling information setting subroutine-call. In case of parallel travel, a parallel travel parameter is set and in case of rotational travel, heading parameter of scrolling on the X-Y plane around the Y axis, bank parameter of scrolling on the X-Y plane around the Z axis or pitching parameter of scrolling on the Y-Z plane around the X axis is set and then zooming parameter is set. Then scrolling speed setting subroutine is called and if speed 1, for example, is decided, the scrolling timer is switched ON to set T=1S, resulting in scrolling by a frame per second. Control returns from the subroutine to the main routine. After the final process and final item is checked on completion of the entire cutting operation, the display unit 22 displays the ending machine stored in the ROM 11, and the entire control operation is completed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims and therefore intended to be embraced therein.

What is claimed is:

1. In a numerically controlling machine tool, of the type having a computer, a display unit and a keyboard and controlled by a machining program and numerical information previously stored in the computer, a method of entering and displaying machining information necessary for machining a workpiece comprising the steps of:

inputting to the computer a machining mode of point, line, and face;

inputting into the computer numerical data representative of the finish machining contour of a workpiece specified in a corresponding engineering drawing;

classifying and computing the finish machining contour into machining modes of point, line and face;

subclassifying the respective machining modes into a plurality of machining units;

displaying machining information corresponding to the classified machining units on the display unit;

selecting and inputting into the computer machining information necessary for machining the workpiece; and displaying condition of the workpiece being machined on the display unit, while computing a machining program corresponding to the inputted machining information.

2. The method as defined in claim 1 wherein said point machining mode is classified into a drilling unit, a counter boring unit, a back counter boring unit, a reaming unit, a tapping unit, a boring unit, a back boring unit and a circular milling unit.

3. The method as defined in claim 1 wherein said line machining mode is classified into a line center machining unit, a line right machining unit, a line left machining unit, a line outside machining unit, a line inside machining unit, a chamfering outside machining unit, and a chamfering inside machining unit.

4. The method as defined in claim 1 wherein said face machining mode is classified into a face milling unit, a top end milling unit, a step end milling unit, a pocket end milling unit, a mountain pocket end milling unit, a valley pocket end milling unit and a slot end milling unit.

5. The method as defined in claim 2 including the further steps of, in each machining unit of the point machining mode, entering cutting width and depth of cut and reading machining information for each tool corresponding to the tool, its cutting conditions, machining order and the like.

6. The method as defined in claim 3 including the further steps of, in each machining unit of the line machining mode, entering cutter diameter, depth of cut and tool path and reading machining information corresponding to each tool, its path, its cutting conditions and the like.

7. The method as defined in claim 4 including the further steps of, in each machining unit of the face machining mode, entering cutter diameter, depth of cut and machining area and reading machining information corresponding to each tool, its path, its cutting conditions and the like.

8. The method as defined in claim 1 wherein said workpiece condition displaying step comprises displaying on the display unit the machining contour of a workpiece specified in a corresponding engineering drawing; and the path of a tool moving on the workpiece by using various colors allocated for each tool or machining patterns.

* * * * *